(12) United States Patent
Fischer

(10) Patent No.: US 11,284,698 B2
(45) Date of Patent: Mar. 29, 2022

(54) COSMETIC APPLICATOR WITH SPECIAL BRISTLE

(71) Applicant: GEKA GmbH, Bechhofen (DE)

(72) Inventor: Werner Fischer, Burk (DE)

(73) Assignee: GEKA GMBH, Bechhofen (DE)

( * ) Notice: Subject to any disclaimer, the term of this patent is extended or adjusted under 35 U.S.C. 154(b) by 681 days.

(21) Appl. No.: 16/301,538

(22) PCT Filed: May 15, 2017

(86) PCT No.: PCT/EP2017/061609
§ 371 (c)(1),
(2) Date: Nov. 14, 2018

(87) PCT Pub. No.: WO2017/198614
PCT Pub. Date: Nov. 23, 2017

(65) Prior Publication Data
US 2019/0289984 A1 Sep. 26, 2019

(30) Foreign Application Priority Data

May 17, 2016 (DE) .......................... 202016102620.2

(51) Int. Cl.
*A45D 40/26* (2006.01)
*A46B 9/02* (2006.01)
(Continued)

(52) U.S. Cl.
CPC ......... *A45D 40/267* (2013.01); *A45D 40/265* (2013.01); *A46B 3/005* (2013.01);
(Continued)

(58) Field of Classification Search
CPC ........... A46B 9/028; A46B 9/021; A46B 9/02; A46D 1/0238; A46D 1/0269; A45D 40/267; A45D 40/265
See application file for complete search history.

(56) References Cited

U.S. PATENT DOCUMENTS 6,412,496 B1 * 7/2002 Gueret ................. A45D 40/267
132/218
6,539,950 B1 4/2003 Gueret
(Continued)

FOREIGN PATENT DOCUMENTS

CN 1317944 A 10/2001
CN 202179267 U 4/2012
(Continued)

OTHER PUBLICATIONS

Office Action dated Feb. 3, 2020 in related Chinese application 201780034322.X.
(Continued)

*Primary Examiner* — Shay Karls
(74) *Attorney, Agent, or Firm* — Polson Intellectual Property Law, PC; Margaret Polson; Christopher Sylvain

(57) ABSTRACT

A cosmetic applicator with a bristle carrier (9), which merges into a stem (12), by way of which the bristle carrier (9) is connected to a handle (13), or into a coupling portion (11) for connecting the bristle carrier (9) to such a stem (12), wherein the bristle carrier (9) carries a multiplicity of in each case single-piece bristles (1) of length (L) and is distinguished in that the bristles (1) consist of two halves (2, 3), which are axially symmetrical relative to one another and are displaced relative to one another, and connected in one piece to one another, along their axis of symmetry (4), wherein each of the halves (2, 3) forms a planar region (6) of the bristle (1), said planar region being located in the displacement plane (5).

12 Claims, 5 Drawing Sheets

(51) Int. Cl.
*A46D 1/00* (2006.01)
*B29C 45/14* (2006.01)
*B29C 45/26* (2006.01)
*A46B 3/00* (2006.01)
*B29L 31/42* (2006.01)

(52) U.S. Cl.
CPC .............. *A46B 9/021* (2013.01); *A46B 9/028* (2013.01); *A46D 1/00* (2013.01); *A46D 1/0238* (2013.01); *A46D 1/0269* (2013.01); *A46D 1/0276* (2013.01); *B29C 45/14385* (2013.01); *B29C 45/2626* (2013.01); *A46B 2200/1053* (2013.01); *B29L 2031/42* (2013.01)

(56) References Cited

U.S. PATENT DOCUMENTS

| | | | | |
|---|---|---|---|---|
| 7,665,473 | B1 * | 2/2010 | Gueret | A46D 1/0238 |
| | | | | 132/218 |
| D749,327 | S * | 2/2016 | Thierer | D4/128 |
| 9,427,075 | B2 * | 8/2016 | Gueret | A46B 9/021 |
| 10,278,478 | B2 * | 5/2019 | Sanchez | A46B 1/00 |
| 2015/0020332 | A1 | 1/2015 | Jacob et al. | |

FOREIGN PATENT DOCUMENTS

| | | |
|---|---|---|
| CN | 103179874 A | 6/2013 |
| DE | 10212701 A1 | 10/2003 |
| FR | 2930874 A1 | 11/2009 |
| FR | 2993441 A1 | 1/2014 |
| JP | 2001145515 A | 5/2001 |
| JP | 2008093105 A | 4/2008 |
| JP | 2011519670 A | 7/2011 |
| WO | 2009138647 A2 | 11/2009 |

OTHER PUBLICATIONS

Office Action dated Mar. 22, 2021 in related Japanese application 2018-561029.
International Search Report dated Nov. 23, 2017 in parent International application PCT/EP2017/061609.
N parent International application PCT/EP2017/061609International Preliminary Report on Patentability, Chapter II, dated Nov. 2, 2018.

* cited by examiner

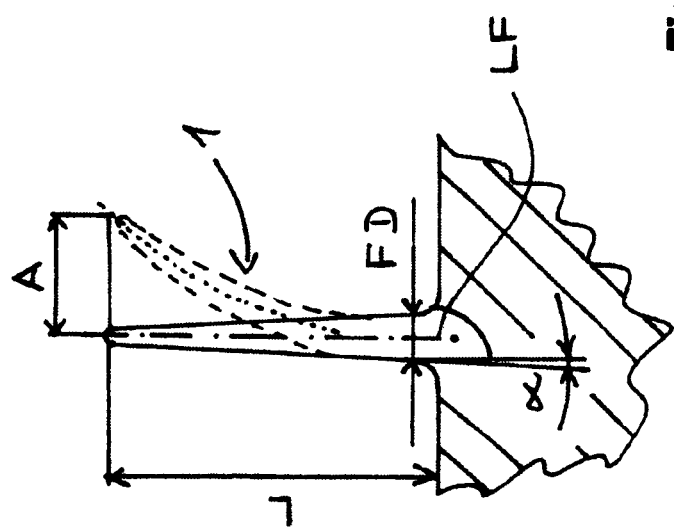

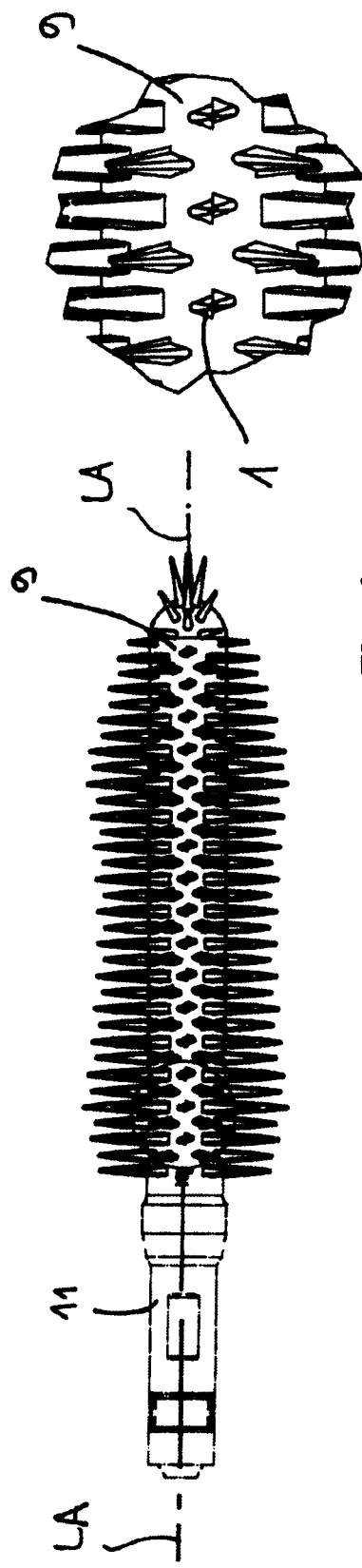
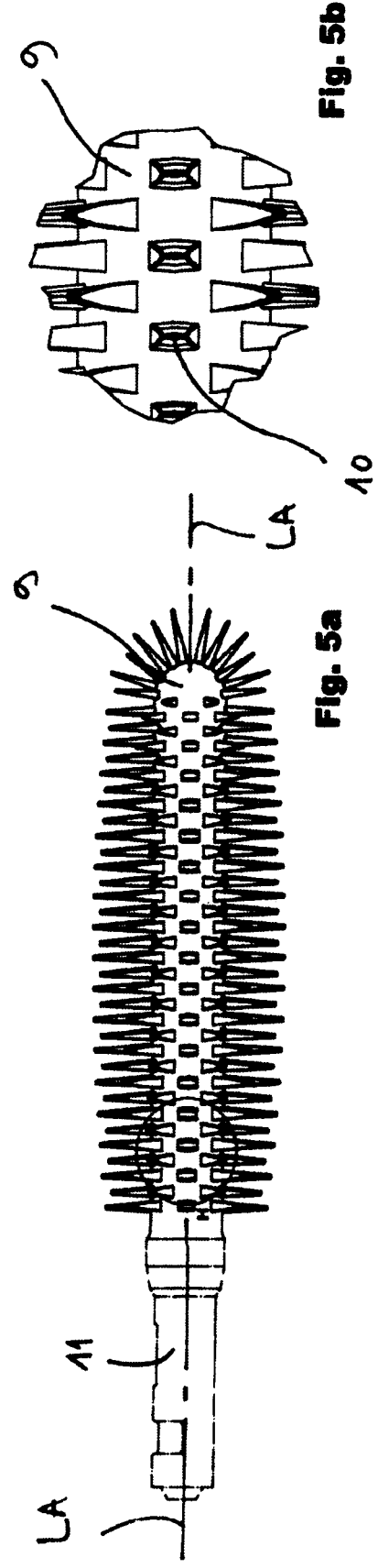

COSMETIC APPLICATOR WITH SPECIAL BRISTLE

BACKGROUND

The present disclosure relates to a cosmetic applicator, a corresponding cosmetic applicator system, and an injection mold for producing a corresponding cosmetic applicator.

The application behavior of a cosmetic applicator is decisively influenced by how well it is possible to control the process of loading the cosmetic applicator with the cosmetic that is to be applied. This is particularly true for the type of cosmetic applicators in question here, which, for application purposes, are stored by inserting them into a cosmetic receptacle and into the cosmetic contained therein and are then pulled out of the cosmetic receptacle through a stripper and, provided with the required load, are ready for the application.

Usually, the aim is to control the loading of the cosmetic applicator by means of the rheological properties of the cosmetic and/or the density of the bristle set and to control the interaction between the bristle set and the stripper. By and large, this is already being achieved quite successfully, depending on the cosmetic to be used.

But there is still need for improvement.

This is particularly true in cases in which the cosmetic that is to be applied is a mascara compound because mascara application in particular has to meet extremely stringent requirements. On the one hand, it should preferably be possible to only have to perform one insertion in order to perform a complete mascara application on the eyelashes of one eyelid. On the other hand, the mascara applicators must have outstanding separation properties so that the individual lashes do not stick to one another. In addition, these applicators are also often required to have the ability to produce a so-called curling effect, i.e. the ability to give the lashes an attractive curvature.

Profiled bristles for cosmetic/mascara applicators have also already been proposed in the prior art. In this regard, reference is made to DE 102 12 701 A1.

The profiled bristles proposed by this application, however, consistently cause problems in the production of the applicator. This is because these profiled bristles, after being produced by injection molding, often cannot be reliably removed from the mold. Occasionally, at least some individual bristles tear off in the region of the profiling when the solidified, but still warm, plastic compound in the injection mold does not detach quickly enough from the wall of the bristle-forming cavity to allow them to be pulled out of the cavity in an unimpeded fashion as the injection mold is opened.

SUMMARY

An aspect of the present disclosure is to provide an applicator with bristles, whose remaining load after the stripping can be finely adjusted by the designer and which can be produced with no trouble.

This is achieved by a cosmetic applicator having a bristle support that transitions into a wand, which connects the bristle support to a handle, or that transitions into a coupling section for connecting the bristle support to such a wand.

The bristle support carries a plurality of respective one-piece bristles, which have an overall length L. The bristles are each composed of two imaginary halves that are axially symmetrical relative to each other, i.e. that correspond to each other. The two halves are offset relative to each other along a plane in which their symmetry axis lies. Since the halves (as such) are of an only imaginary nature, they are integrally connected to each other and thus form one whole. Each of these halves constitutes a flat region on the bristle, which lies in the offset plane.

This type of design yields an integral bristle, which has a recess along its flank in a direction parallel to the bristle longitudinal axis, which is filled with cosmetic when the bristle is dipped into the cosmetic reservoir and even when the bristle passes through the stripper, this cosmetic is essentially not stripped away, instead remaining in the recess of the bristle. The designer can make this recess more or less strongly pronounced depending on the degree to which the two halves are offset relative to each other along the offset plane.

At the same time, such bristles can be produced easily and with a significantly reduced risk of rejects.

Additional Embodiment Options

Ideally, the bristle support has a plurality of respective one-piece bristles, which along their entire length L, have a bristle cross-section composed of two parts that are offset relative to each other in a plane.

Preferably, the bristles taper continuously from their base to their tip. Ideally, the envelope surface of a bristle altogether encloses an angle of ≤7.5° with the bristle longitudinal axis L.

In addition, the bristle is preferably embodied so that the two halves are offset relative to each other along their symmetry axis such that the tips of the two halves touch each other over an area of at least 30%. This produces a uniform tip and prevents lashes from getting caught in the narrow gap between two separate tips and producing an unwanted tugging sensation on the lashes when the applicator is used.

Ideally, the bristles are composed of two pyramid halves that are axially symmetrical to each other. The corresponding pyramid—composed of the pyramid halves, imagining the latter as not offset from each other—has a square, rectangular, rhomboid, or hexagonal base. During application, such bristles exhibit a particularly advantageous rigidity and an advantageous bending behavior and at the same time, embodying the plane according to the present disclosure between such bristles can be accomplished with particular ease by positioning the bristle halves so that they are offset from each other.

Alternatively, for some applications, it can be advantageous to embody the bristle so that it is composed of two cone halves that are axially symmetrical to each other, which—when not offset relative to each other—have a circular, elliptical, oval, almond-shaped, or plum-shaped base.

The bristles can interact in a particularly advantageous way with the lashes if the edges that are produced by the offset of the pyramid/cone halves are sharp-edged and preferably transition into each other with a radius RA of ≤0.01 mm.

It is particularly advantageous if in addition, the distal end of the bristle support is equipped with end bristles at its free end. Ideally, the longitudinal axes of at least four of the end bristles lie in the plane in which the applicator longitudinal axis also lies. Then ideally, the plane of the applicator longitudinal axis will define a fan of bristles, which is particularly well-suited for combing the lashes when the applicator is guided frontally with its end approaching the eyelashes of an eyelid.

Injection Mold Used for Producing the Bristle

In addition, the present disclosure also relates to an injection mold for producing a cosmetic applicator with bristle cavities.

To be specific, due to the special design of the bristle according to the present disclosure, it can be produced for the first time using injection molds that are embodied as follows:

The injection mold according to the present disclosure forms bristle cavities, each of which forms a bristle. The injection mold is divided into a plurality of circle segment-shaped mold parts. These can be moved apart in the radial direction in order to thus enable the demolding of an applicator that has been previously injection molded using the injection mold. The injection mold in this case is embodied so that a first and second circle segment-shaped mold part, which rest against each other with their flat flanks along a parting plane parallel to the longitudinal axis of the injection mold, form the cavities for a row of bristles extending in a direction parallel to the longitudinal axis of the applicator. This is accomplished in that a first half of the respective cavities is embodied in a first circle segment-shaped mold part and a second half of the cavities is embodied in a second circle segment-shaped mold part. The first and second halves of the respective cavity, which on the whole forms a single bristle, are positioned offset relative to each other in the direction of the parting plane, i.e. the parting plane between the mold parts in this case corresponds to the offset plane. In so doing, these two halves partially overlap. This means that the two first and second circle segment-shaped mold parts of the injection mold that rest with their flanks against each other form each of the above-mentioned bristles. In order to ensure safe removal from the mold, it is sufficient to move the two circle segment-shaped mold parts slightly apart from each other in the radial direction, causing them to immediately lift away from the respective bristle. The two grooves or recesses that have been produced in the bristles in this way do not cause any problem during removal from the mold. This is because the grooves or recesses lie exactly at the parting point between the first and second circle segment-shaped mold parts, i.e. in the region in which the parts of the mold move away from each other as the mold is being opened and as a result, the bristle is immediately released.

Other Aspects

The present disclosure also relates to the use of the cosmetic applicator with the bristles according to the present disclosure, i.e. the use of a cosmetic applicator that features the fact that by dipping the cosmetic applicator into and removing it from the cosmetic reservoir so that it passes through a stripper, cosmetic compound is removed and with the aid of the cosmetic applicator, this compound is transported to the lashes that are to be treated and is at least partially applied to them.

The present disclosure also relates to a cosmetic applicator system including a cosmetic storage receptacle, cosmetic compound that is kept stored therein—preferably in the form of a mascara compound—, a stripper, and an applicator, which, when not in use, is inserted through the stripper into the cosmetic receptacle and dipped into the cosmetic reservoir and which, for purposes of the application, can be pulled out of the cosmetic storage receptacle through the stripper and guided to the application point, wherein the applicator is an applicator according to present disclosure.

The present disclosure also relates to a cosmetic applicator having a bristle support that transitions into a wand, which connects the bristle support to a handle, or transitions into a coupling section for connecting the bristle support to such a wand, with the bristle support carrying a plurality of respective one-piece bristles of such a length characterized in that over their entire length, the bristles have one bristle cross-section, which is composed of two parts that are offset relative to each in a plane.

The present disclosure also relates to a cosmetic applicator, which features the fact that the distal end of the bristle support is equipped with end bristles at its free end.

Other effects, embodiment options, and advantages of the present disclosure ensue from the description of the depicted embodiments taken in conjunction with the figures listed below.

BRIEF DESCRIPTION OF THE DRAWINGS

FIG. 1 is an abstract, general illustration of what is understood by the term "bristle" in the context of the present disclosure.

FIG. 4a shows an embodiment of a whole cosmetic applicator with bristles according to FIG. 2 in a first rotation position.

FIG. 4b shows an enlarged detail from FIG. 4a.

FIG. 5a shows an embodiment of the whole cosmetic applicator with bristles according to FIG. 2 in a second rotation position.

FIG. 5b shows an enlarged detail from FIG. 5a.

DETAILED DESCRIPTION

FIG. 1 shows what is understood by the term "bristle" in the context of the present disclosure without showing the profiling of the bristle according to the present disclosure.

According to this depiction, a bristle is a slender, flexible rod made of plastic that protrudes outward entirely or essentially entirely from the bristle support in the radial direction.

The maximum dimension FD of a bristle in the region of its base is preferably between 0.01 mm and 0.06 mm. A base region of a bristle here signifies the bristle region, which is situated the closest to the bristle support and remains unaffected, i.e. is situated above the rounding with which the bristle may transition into the bristle support, also see FIG. 1.

The length of a bristle along the bristle longitudinal axis L is preferably greater by at least a factor of 5—better still, by at least a factor of 7—than the greatest dimension FD of the bristle in the base region.

A bristle is typically elastic enough that with the forces occurring during the application, it can be flexibly/elastically deflected relative to its plumb-line base point LF by an amount A transverse to its bristle longitudinal axis (in comparison to the unstressed state), which corresponds to at least 4 times—better still, at least 6 times—the greatest dimension FD of the bristle in the base region.

The maximum dimension FD of a bristle in the region of its bristle base location is preferably between 0.01 mm and 0.06 mm.

In the context of the present disclosure, a bristle is as a rule produced by injection molding. In this case, injection molding is not just a production method; it also gives the bristle its physical shape. Injection molded bristles feature the fact that the plastic molecular chains in the region of the bristle itself, where the injection molding activity is by nature very slender, are oriented in the longitudinal direction in a particular way and for the most part, do not exhibit any knotting. As a result, the bristles are given good elastic properties and an especially favorable capacity for bend recovery.

As a result, the bristles straighten up again and can resume their original position when they have been pulled through a stripper and have thus been folded down by the latter.

Figure 7:
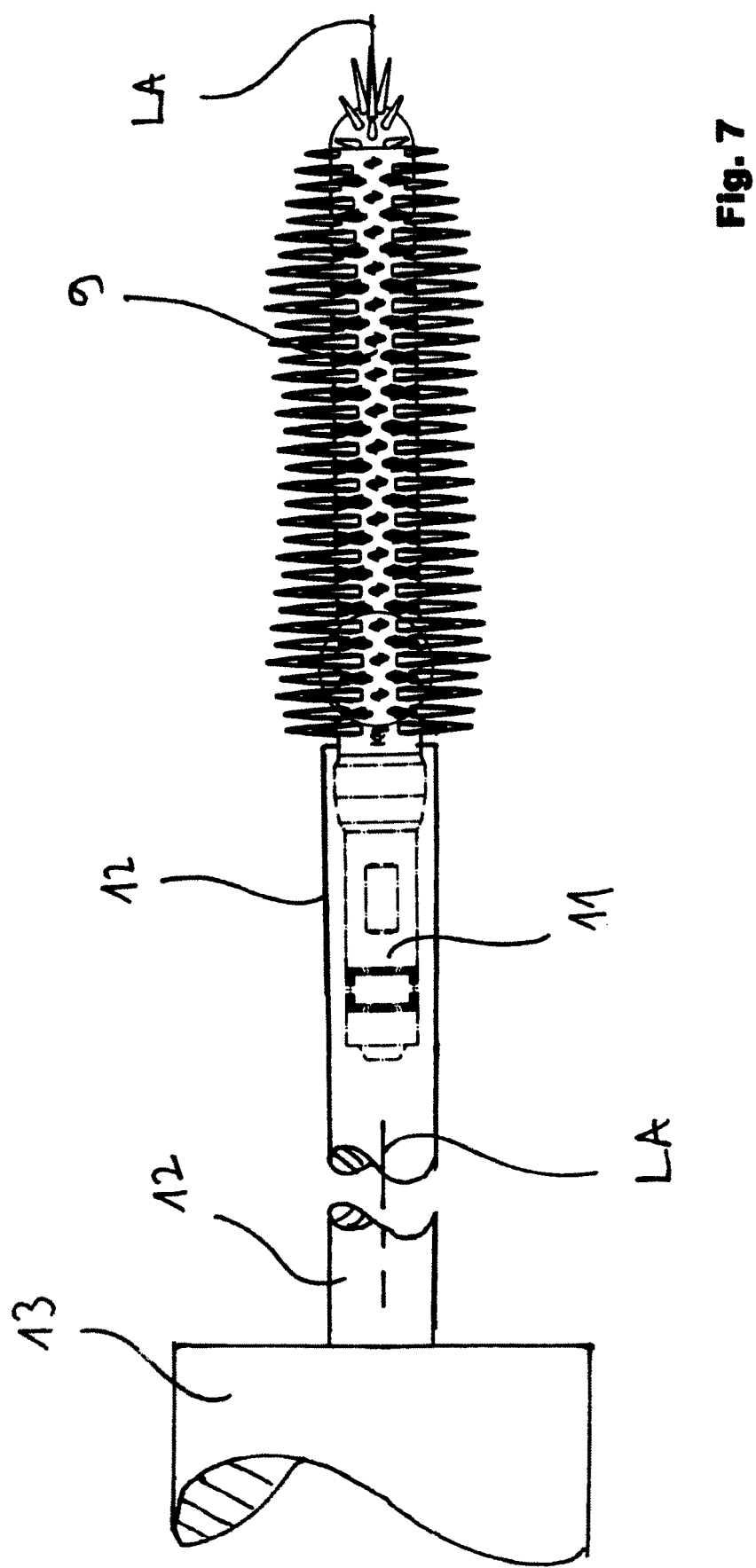
FIG. 7 shows an overall view of an applicator according to the present disclosure with a wand and handle.

FIG. 7 shows an overview of the appearance of an applicator according to the present disclosure in a preferred form.

The generally cylindrical bristle support 9, which is equipped with the bristles 1 that will be discussed in further detail below, is connected—preferably by means of its coupling section 11—to the wand 12. The bristle support 9 has a longitudinal axis, which in this case corresponds to its cylinder axis. The longitudinal axis of the wand 12, which is embodied at least in some regions as generally tubular, preferably coincides with the longitudinal axis (cylinder axis) of the bristle support 9. The wand 12 transitions into a handle 13, which as a rule, constitutes a closing cap or cover of a cosmetic receptacle.

Figure 2A:
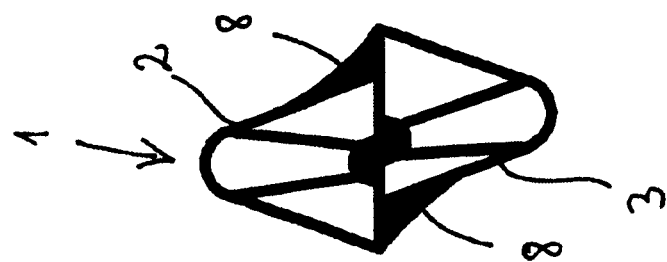
FIG. 2a shows the bristle according to FIG. 2 in the state in which it is loaded with cosmetic compound.
Figure 2:
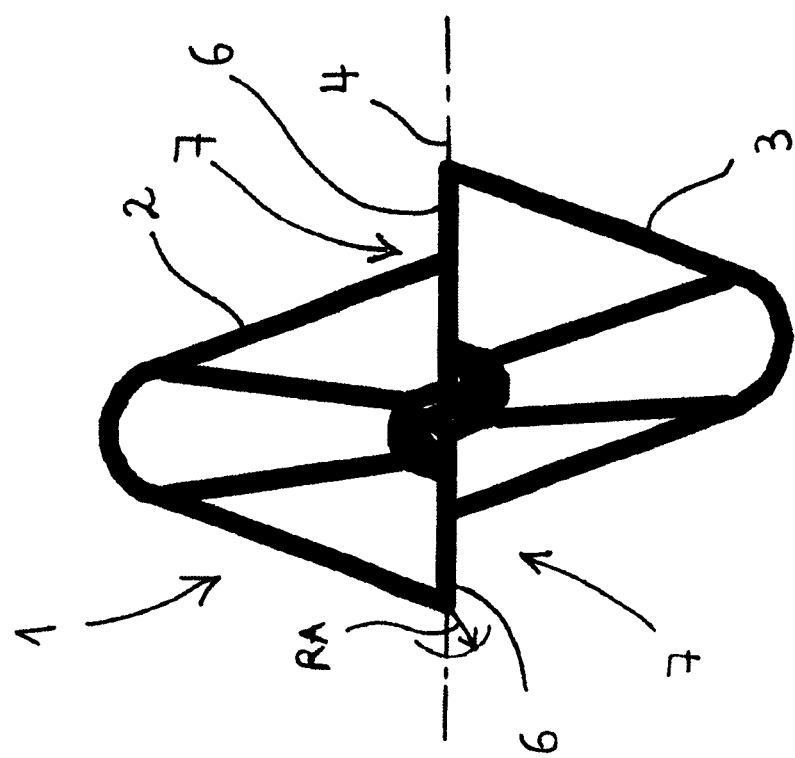
FIG. 2 shows a bristle for the applicator according to the present disclosure in a frontal view from above.

FIG. 2 shows the special cross-sectional form of the bristles according to the present disclosure.

Figure 3:
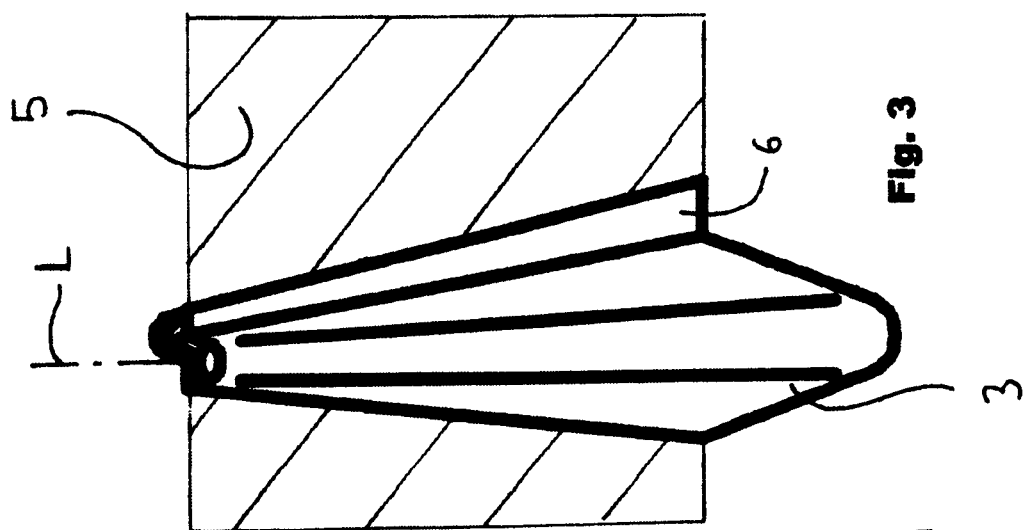
FIG. 3 shows the bristle according to FIG. 2 in a perspective side view.

FIG. 2 is a top view of such a bristle; FIG. 3 is a perspective side view of such a bristle.

As is readily apparent, the bristle 1 is composed of a first half 2 and a second half 3. The two halves transition into each other in integral fashion at the location in which they contact each other. They therefore constitute a coherent bristle composed of a single piece. The two halves are produced in such a way that the plastic compound composing the bristle is cooled in the injection mold. The two halves have thus been originally molded together and not been attached to each other subsequently. There is thus no gap between them and no parting line or welding seam that could become detached.

The two halves 2 and 3 are axially symmetrical to an imaginary symmetry axis 4, i.e. the cross-section of the first half 2 of the bristle 1 corresponds to the cross-section of the second half 3 of the bristle when reflected—imagined without the offset—relative to the symmetry axis 4. Slight local deviations, for example due to tolerances, are inconsequential.

As is shown the most clearly in FIG. 3, a so-called offset plane 5 can be defined, which is a plane in which the symmetry axis 4 lies, as shown in FIG. 2. The two halves 2 and 3 of a bristle are offset in imaginary fashion relative to each other along the offset plane 5, as a rule along the entire length of the bristle 1, viewed along their longitudinal axis L. As is already clear from the above explanations, with regard to the bristle, the offset is only imaginary in nature—it has been produced structurally during the mold making process in that the two cavity sections that form the bristle halves have been positioned offset relative to each other during the production of injection mold.

This offsetting of the two halves 2 and 3 of a bristle 1 relative to each other produces a flat region or plane 6 on opposite sides of each bristle—at the point where the corresponding half 2 no longer rests against the opposing half 3 due to the offset. As a rule, this plane 6 is present over the entire length or over at least 90% of the length of the bristle, from the bristle base to the bristle tip, and is usually oriented precisely in the radial direction relative to the bristle support. It is thus able to stop an eyelash, which has been introduced between the bristles tangential to the bristle set, and to impart a curvature to it the moment the tip of the eyelash comes into contact with the plane 6. This exerts a significant positive influence on the degree to which the set of bristles according to the present disclosure load the eyelash with compound.

Since the bristle tapers from its base to its tip, the dimensions of this plane 6 decrease in the direction perpendicular to the bristle longitudinal axis L from the bristle base to the bristle tip, preferably in a continuous fashion.

Preferably, the plane 6 connects two larger lateral surfaces of the bristle, whereas the smaller lateral surfaces are situated farther away, see FIG. 2.

As shown in FIG. 2, because of the above-mentioned offset on each bristle 1 on two opposing flanks, a groove or recess 7 is produced (which as a rule, extends in the direction along the longitudinal axis at an inclination angle of ≤5° relative to it). This recess 7 is stilled filled with cosmetic compound 8 even after a bristle passes through the stripper, as shown by FIG. 2a.

It has turned out to be particularly advantageous if the bristle edges 14, which are produced by the offsetting of the bristle halves 2, 3, are sharp-edged. They are embodied in this way even if the surfaces of the bristle that form this bristle edge transition into each other with a radius RA of ≤0.001 mm.

But is worth noting that it is clear from the figures that the two halves 2, 3 are offset relative to each other along the offset plane 5 or their symmetry axis 4 to such an extent that the tips of the two halves still overlap over an area of at least 30% of the length that their cross-section has along the symmetry axis 4.

For other applications, it can be particularly advantageous to offset the two halves of the bristles to such an extent relative to each other that the bristle tips no longer touch, but instead, each bristle has a double tip—the two bristle halves first touch each other below the double tip and then transition into each other in integral fashion. Compound can be stored in the gap separating the double tip and with the aid of the gap, lashes can be held or squeezed, for example in order to perform a curling.

In a preferred embodiment, the bristles according to the present disclosure are each embodied in the shape of a pyramid. This pyramid (before the imaginary offsetting) preferably has a rhomboid outline in which the two more acute-angled corners of the rhombus are preferably rounded.

FIGS. 4a, 4b and 5a, 5b show an entire applicator and how the bristles according to the present disclosure are arranged on it.

The applicator is composed of a bristle support 9. The bristles 1 and 10 protrude from it in the radial direction, preferably precisely in the radial direction. In the first exemplary embodiment, the bristles 1, 10 and the bristle support 9 are composed of the same material and they are integrally connected to each other because as a rule, they are produced in a single work step by means of a single injection molding procedure.

It is clear that the bristle support 9 in this case transitions into a coupling section 11. This coupling section serves to connect to a wand 12, which in turn transitions into a handle 13, as is shown in FIG. 7.

It is also worth noting that the bristles 1 with the special cross-section described here alternate with differently embodied bristles 10, viewed in the circumference direction of the applicator.

In this exemplary embodiment, on two diametrically opposing sides of the bristle support 9, at least three rows of bristles 1 that are parallel in the direction of the applicator longitudinal axis LA are provided with the cross-section according to the present disclosure, see FIGS. 4a, 4b. If the applicator is rotated by 90° so that it presents an image as shown in FIGS. 5a, 5b, then it is clear that in the preferred exemplary embodiment described here, on diametrically opposing sides of the bristle support 9, the conventional bristles 10 also form at least three rows parallel to the longitudinal axis LA.

The resulting different regions of the bristle set are assigned different functions. The section in which there are a plurality of rows with the special bristles according to the present disclosure serves to apply the cosmetic compound or mascara compound to the eyelashes. Once they are loaded with the necessary quantity of mascara compound, the user can rotate the applicator by 90° and then, using the conventional bristles 10, can achieve the necessary combing action and/or can perform a curling without having to also accept an additional heavy application of compound.

The bristles embodied according to the present disclosure advantageously make up only a part of the bristles that constitute the main bristle set of the applicator on the circumference surface of the bristle support. As result of this, it is possible to give the applicator significantly different application properties in different zones depending on the rotation position in which the applicator and its bristle set is guided against the eyelashes. The bristles that are profiled according to the present disclosure—with their high compound storage capacity—are used to first coat the lashes with the required quantity of mascara compound. Then the applicator can be rotated in order to use the conventional bristles—which are loaded with significantly less mascara compound—to comb the eyelashes or to perform a curling.

It has turned out to be particularly advantageous if the bristle halves are embodied as pyramid halves or cone halves. In this context, a pyramid refers to a shape that protrudes up from a polygonal base and, while basically retaining the edges that are predetermined by the polygonal base, tapers upward to its tip. Only in the zone in which the large main surfaces contact each other is it unnecessary for the edges to protrude as such; instead, they can be rounded, i.e. no longer forming a sharp edge, see FIGS. 2 and 3.

It has turned out to be advantageous if the two pyramid halves that are axially symmetrical relative to each other—when imagined without the offset relative to each other—have a square, rectangular, rhomboid, or hexagonal base.

Alternatively, the bristles can be composed of two cone halves that are axially symmetrical relative to each other, which—when imagined as not being offset relative to each other—have a circular, elliptical, oval, almond-shaped, or plum-shaped base.

It should also be noted that it can be particularly advantageous to also equip the distal end of the applicator oriented away from the handle with end bristles. As is clear from a comparison of FIGS. 7 and 5a, the end bristle set is preferably composed of at least one row of bristles, which forms a fan made up of bristles that are arrayed one after the other in a line. Preferably, this fan-shaped row is composed of at least 8 bristles. The bristles are arranged so that they form a row that extends in an angle of at least 160° around the end surface. Ideally, this row of bristles crosses over the applicator's central longitudinal axis LA. Ideally, this row of bristles is adjoined on both sides by a row of bristles that is arranged parallel to the longitudinal axis LA on the circumference of the bristle support. It is particularly advantageous if on both sides of this row of bristles, another fan-shaped row of bristles extends, whose bristles have longitudinal axes that are respectively inclined at an angle of at least 20° relative to the longitudinal axes of the former row of bristles so that the central bristle fan is adjoined to the left and right by a bristle fan that is angled outward away from the central bristle fan.

In the exemplary embodiment discussed in detail above, the bristle support, the coupling section, and the bristles have been injection molded in one piece from the same plastic compound.

An alternative exemplary embodiment that is not graphically depicted here is composed of an identically embodied applicator in which a rod-shaped bristle support is injection molded of a plastic material that differs from the plastic compound of which the bristles are composed. The plastic that forms the bristles is thus injection molded onto the bristle support. The bristles are then as a rule composed of a plastic material that is more flexible than the plastic material of the rod-shaped bristle support.

Another alternative exemplary embodiment features the fact that a rod-shaped, hollow-centered bristle support is used, whose walls are thin enough that the second plastic compound that is injection molded into the inner cavity of the bristle support breaks outward through the wall of the bristle support and as a result, shoots into the bristle cavities surrounding the bristle support, forming the bristles therein. In this exemplary embodiment as well, the bristles are then as a rule composed of a plastic material that is more flexible than the plastic material of the rod-shaped bristle support.

Finally, another alternative exemplary embodiment features the fact that the applicator is produced using sandwich injection molding. In a first step, a first plastic compound is injected into the injection mold, which is the bristle-forming compound. In a second step, a second plastic compound is injected into the first plastic compound, which has not yet solidified. In this way, the second plastic compound, which is as a rule harder than the first, forms a bristle support (and optionally also a coupling element), which is encased in the first plastic compound at one end and around its circumference.

Figure 6:
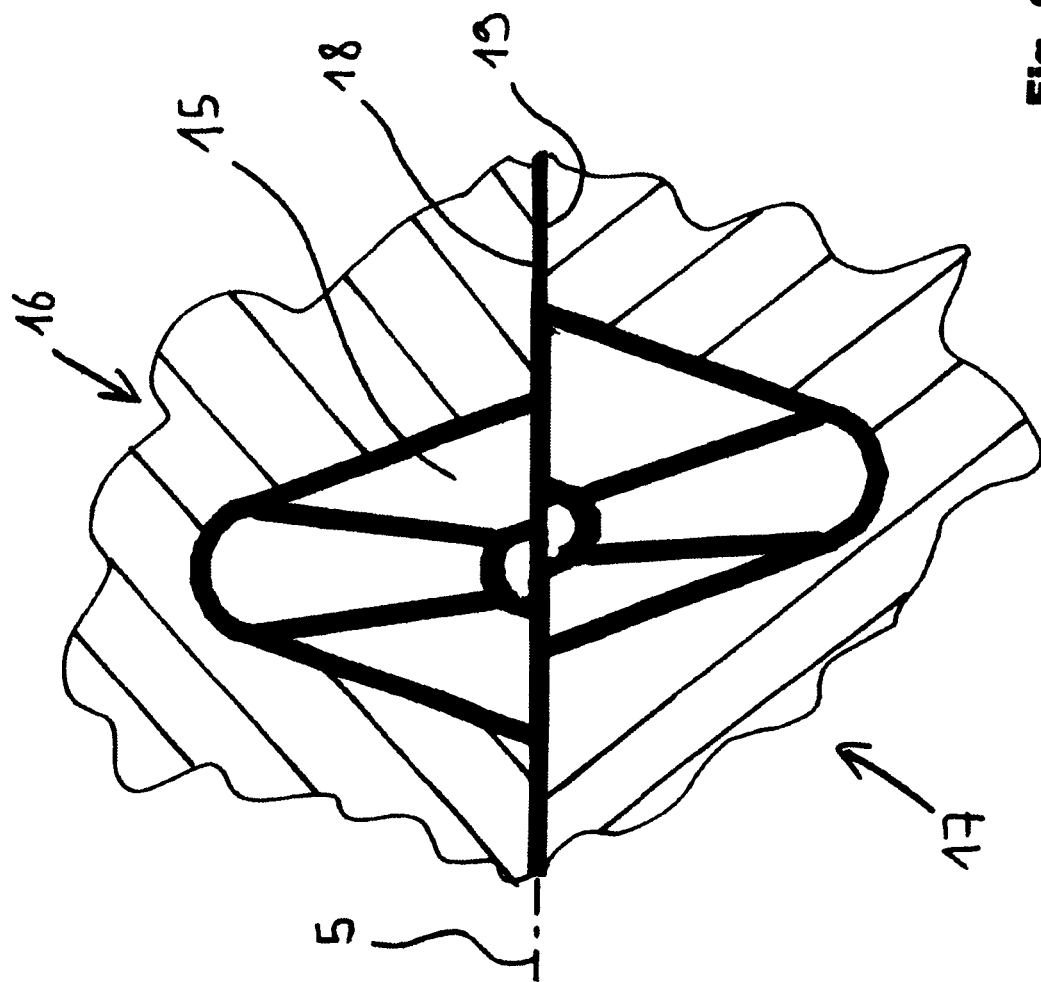
FIG. 6 shows a detail of an injection mold of the kind that is used for producing the bristles and applicators according to the present disclosure.

The bristle design according to the present disclosure has a particularly advantageous effect on the injection mold used for producing such an applicator, sections of which are shown in FIG. 6—in this case, the view is from the side of the bristle base, looking into the bristle cavity 15.

An injection mold of this kind has a plurality of these bristle cavities 15, each of which forms a bristle 1 after having been filled by injection.

In this case, the injection mold is divided into a plurality of for the most part circle segment-shaped mold parts 16, 17, which can be moved apart from one another in the radial direction in order to be able to remove an applicator, which has formed with the injection mold, from the mold, which is not graphically depicted in detail here.

A first and second mold part 16, 17 rest with their flat flanks 18, 19 tightly against each other along a parting plane in the closed mold. Together, they form a bristle cavity 15 for each bristle. The cavities for a bristle row are positioned along the parting plane 5, which in this case, extends perpendicular to the plane of the drawing.

For each bristle according to the present disclosure, the bristle cavity is embodied so that the one half of this bristle cavity is embodied in the first mold part and a second half of the cavity is embodied in the second mold part. Each half of the cavity is open not only on the side of the bristle base, but also on the side of the parting plane in which the two mold parts rest against each other. The first and second halves of the respective cavity that cooperate to form a bristle are positioned offset relative to each other in the direction along the parting plane and partially overlap each other. In this way, each half of the cavity in the one mold part cooperates with the associated other half of the cavity in the other mold part to form a complete bristle cavity, which is open only at the end of the bristle base and may optionally have a ventilation opening at the end of the bristle tip.

After the injection molding of the bristle, the mold parts 16 and 17 are moved apart from each other with a movement component in the direction perpendicular to the flat flanks 18 and 19 with which they rest against each other in the closed state. As a result, the mold opens precisely at the plane 6 of each bristle so that the offset in the bristle that is produced here can be easily removed from the mold and does not cause any trouble as the unmolding is performed. This distinguishes the injection mold according to the present disclosure and method according to the present disclosure. This is because the removal from the mold of the fissure with which the plane 6 transitions into the two large side surfaces of the bristle that connects them directly to each other would cause problems in a mold that did not divide at this point and quite often would cause the bristle to tear off because it has not detached from the wall of the mold cavity to a sufficient degree when the completely injection-molded applicator is pulled out.

As a rule, the two halves of the cavity are embodied as identical and mirror symmetrical, which simplifies production.

REFERENCE NUMERAL LIST

1 bristle
2 first half of a bristle
3 second half of a bristle
4 symmetry axis
5 offset plane
6 flat region of a bristle
7 recess
8 cosmetic compound
9 bristle support
10 differently embodied bristle
11 coupling section
12 wand
13 handle
14 bristle edge
15 bristle cavity
16 first mold part
17 second mold part
18 flat flank of the first mold part
19 flat flank of the second mold part
L length of a bristle
FD maximum dimension of a bristle in its base region
LF plumb-line base point of a bristle
A elastic deflection of a bristle
RA radius
LS end bristle longitudinal axis
LA applicator longitudinal axis

The invention claimed is:

1. A cosmetic applicator having a bristle support that transitions into a wand which connects the bristle support to a handle, or transitions into a coupling section for connecting the bristle support to such a wand, comprising:
   the bristle support carrying a plurality of respective one-piece bristles, each of the bristles having a length extending along a longitudinal axis of the bristle,
   wherein the bristles are each composed of two integral bristle halves that are axially symmetrical relative to each other and are offset relative to each other along an offset plane in which a symmetry axis—which refers to an imaginary non-offset state of the two bristle halves—lies, and are connected to each other in one piece by having been originally molded together,
   wherein each of the two bristle halves form a flat region of the bristle that lies in the offset plane, the flat regions of the two bristle halves facing in opposite directions from one another in the offset plane, and the two bristle halves contact each other and transition into each other in integral fashion along the length of the bristle, with each bristle half transitioning into the flat region of the other bristle half.

2. The cosmetic applicator of claim 1, wherein the bristles taper continuously from their base to their tip.

3. The cosmetic applicator of claim 2, wherein the two bristle halves are offset relative to each other along their symmetry axis to such a degree that the tips of the two bristle halves are situated next to each other so that the tips no longer meet.

4. The cosmetic applicator of claim 1, wherein the bristles make up only some of the bristles that combine to form a bristle set of the cosmetic applicator.

5. The cosmetic applicator of claim 1, wherein the two bristle halves are pyramid halves or cone halves.

6. The cosmetic applicator of claim 5, wherein the bristles are composed of two pyramid halves that are axially symmetrical relative to each other which—when imagined as not being offset relative to each other—form a triangular, square, rectangular, rhomboid, or hexagonal base.

7. The cosmetic applicator of claim 5, wherein the bristles are composed of two cone halves that are axially symmetrical relative to each other which—when imagined as not being offset relative to each other—form a circular, elliptical, oval, almond-shaped, or plum-shaped base.

8. The cosmetic applicator of claim 1, wherein edges, which are produced by the offsetting of the two bristle halves, are sharp-edged in that the edges transition with a radius (RA) of ≤0.01 mm.

9. The cosmetic applicator of claim 1, wherein the distal end of the bristle support has end bristles at its free end.

10. The cosmetic applicator of claim 9, wherein longitudinal axes of the end bristles enclose an angle of less than 35° with the longitudinal axis of the bristle support.

11. The cosmetic applicator of claim 10, wherein the longitudinal axes of at least four of the end bristles lie in a plane in which the longitudinal axis of the cosmetic applicator also lies.

12. A cosmetic applicator system including the cosmetic applicator of claim 1, a cosmetic storage receptacle, a cosmetic compound contained within the cosmetic storage receptacle, and a stripper, wherein the cosmetic applicator, when not in use, can be inserted through the stripper into the cosmetic storage receptacle, and, for purposes of application, can be pulled out of the cosmetic storage receptacle through the stripper and guided to an application point.

* * * * *